(12) United States Patent
Kastelic et al.

(10) Patent No.: US 12,679,067 B2
(45) Date of Patent: Jul. 14, 2026

(54) COLORED CARBON FIBER VEHICLE TRIM COMPONENT

(71) Applicant: JOYSON SAFETY SYSTEMS ACQUISITION LLC, Auburn Hills, MI (US)

(72) Inventors: Kurt Kastelic, Rochester, MI (US); Joel George, Fraser, MI (US); Gael Palmieri, San Bonifacio (IT)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 704 days.

(21) Appl. No.: 17/954,705

(22) Filed: Sep. 28, 2022

(65) Prior Publication Data

US 2023/0101130 A1 Mar. 30, 2023

Related U.S. Application Data

(60) Provisional application No. 63/250,720, filed on Sep. 30, 2021.

(51) Int. Cl.
| | |
|---|---|
| *B32B 7/023* | (2019.01) |
| *B32B 3/26* | (2006.01) |
| *B32B 5/12* | (2006.01) |
| *B32B 27/12* | (2006.01) |
| *B32B 27/20* | (2006.01) |
| *B60R 13/02* | (2006.01) |

(52) U.S. Cl.
CPC .............. *B32B 7/023* (2019.01); *B32B 3/266* (2013.01); *B32B 5/12* (2013.01); *B32B 27/12* (2013.01); *B32B 27/20* (2013.01); *B60R*
*13/0256* (2013.01); *B32B 2260/021* (2013.01); *B32B 2260/046* (2013.01); *B32B 2262/106* (2013.01); *B32B 2307/402* (2013.01); *B32B 2307/72* (2013.01); *B32B 2605/003* (2013.01)

(58) Field of Classification Search
CPC ........... B32B 3/266; B32B 5/12; B32B 7/023; B32B 27/12; B32B 27/20; B60R 13/0256
See application file for complete search history.

(56) References Cited

U.S. PATENT DOCUMENTS

| | | | | |
|---|---|---|---|---|
| 2013/0149491 A1* | 6/2013 | Wakeman | ............... | B29C 65/02 |
| | | | | 428/114 |
| 2013/0337219 A1* | 12/2013 | Shields | ..................... | B32B 5/26 |
| | | | | 428/116 |
| 2017/0320532 A1* | 11/2017 | Salvaggio, Jr. | .......... | B62J 50/40 |
| 2018/0154606 A1* | 6/2018 | Francis | .................. | B32B 5/024 |

* cited by examiner

*Primary Examiner* — Maria V Ewald
*Assistant Examiner* — Ethan Weydemeyer
(74) *Attorney, Agent, or Firm* — Meunier Carlin & Curfman LLC

(57) ABSTRACT

A vehicle trim component according to various implementations comprises a first layer and a second layer. The first layer comprises a first surface and a second surface, the second surface coupled to a surface of the second layer. The first layer is formed from carbon fiber and thermoset resin and defines a plurality of holes and/or gaps. The first layer further comprises a color pattern and the second layer comprises a different color pattern, the color pattern of the second layer being visible through the holes and/or gaps in the first layer when viewed from the first surface of the first layer.

21 Claims, 5 Drawing Sheets

60

Chop black carbon fiber pieces and drop onto moving conveyor of resin — 61

Cure to form low density, black carbon fiber sheet — 62

Place colored carbon fiber sheet over trim component mold — 63

Place low density, black carbon fiber sheet onto colored carbon fiber sheet — 64

Cure the carbon fiber sheets together to form vehicle trim component — 65

COLORED CARBON FIBER VEHICLE TRIM COMPONENT

BACKGROUND

Vehicle trim components have been made from a variety of materials, including plastics, metals, and composites. One popular example is chromed plastics, such as those used in automobile door handles, door entry floorplates, and dashboard components. Carbon fiber trim components are growing in popularity, but typically comprise a black woven configuration. Some vehicle manufacturers desire a more colorful appearance with a unique carbon fiber configuration. However, making colored carbon fiber trim components has proven difficult to get desirable appearance at a low cost. Therefore, there is a need for an easy to manufacture carbon fiber trim component that provides unique, colorful patterns.

SUMMARY

A vehicle trim component comprises a first layer comprising a first surface and a second surface, the first layer comprising a sheet comprising carbon fiber and thermoset resin. The carbon fiber of the first layer comprises a color pattern. A second layer comprises a surface and a material comprising a color pattern. The surface of the second layer is coupled to the second surface of the first layer. The first layer defines a plurality of holes and/or gaps through which the surface of the second layer is visible when viewed through the first surface of the first layer.

Also disclosed is a vehicle trim component comprising a first layer comprising a first surface and a second surface, the first layer comprising carbon fiber and a thermoset resin. The carbon fiber of the first layer comprises a color pattern. A second layer comprises a surface and carbon fiber, wherein the carbon fiber of the second layer comprises a color pattern. The surface of the second layer is coupled to the second surface of the first layer. The first layer comprises a plurality of holes and/or gaps through which the surface of the second layer is visible when viewed through the first surface of the first layer.

Also disclosed is a vehicle trim component comprising a first layer comprising a first surface and a second surface. The first layer comprises a sheet of chopped carbon fiber and a thermoset resin. The chopped carbon fiber comprises a color pattern. A second layer comprises a surface and a sheet of unidirectional carbon fiber. The sheet of unidirectional carbon fiber comprises a color pattern. The surface of the second layer is coupled to the second surface of the first layer. The first layer comprises a plurality of holes and/or gaps through which the surface of the second layer is visible when viewed through the first surface of the first layer.

BRIEF DESCRIPTION OF THE DRAWINGS

The drawings are merely exemplary to illustrate structure and certain features that be used singularly or in combination with other features. The disclosure should not be limited to the implementations shown. Liker reference numerals designate corresponding parts throughout the drawings.

DETAILED DESCRIPTION

The devices, systems, and methods disclosed herein provide for a colored carbon fiber vehicle trim component. The trim component may be used as a decorative and/or structural piece of a vehicle, such as a dashboard in an automobile. The trim component includes at least two layers of carbon fiber material, one black and one in a color different than black. The black layer is comprised of a chopped carbon fiber sheet arranged in a low density configuration. The colored layer is comprised of a unidirectional carbon fiber sheet. By layering the colored carbon fiber sheet beneath the low density, black carbon fiber sheet, a unique colored appearance can be achieved, while maintaining other desirable characteristics of carbon fiber composites, such as a high strength to weight ratio.

Figure 1:
FIG. 1 is a top view of a sheet of colored carbon fiber arranged in a unidirectional configuration.

Referring to FIG. 1, a colored carbon fiber sheet 10 is shown. The colored carbon fiber sheet 10 is in a unidirectional configuration wherein all the carbon fiber filaments 11 making up the colored carbon fiber sheet 10 are parallel to each other and bonded together by a sufficient amount of sizing 12 to bond the carbon fiber filaments 11 together. Sizing 12 may be a resin, such as the same resin as resin 22 or it may be a different resin. The colored carbon fiber sheet 10 comprises no gaps or holes, providing a consistent appearance. A color pattern of the colored carbon fiber sheet 10 can be chosen from any color pattern desired for the intended aesthetics of the trim component, including, but not limited to a solid color, multiple colors, or gradients of one or more colors. In the implementations shown in the FIGS. 1 and 3-6 the color, other than black, of the colored carbon fiber sheet 10 can be chosen from any color desired for the intended aesthetics of the trim component. In some implementations, the colored carbon fiber sheet 10 is dyed using a vapor deposition process that coats the carbon fiber filaments 11 with a colored dye. In other implementations, the color of the colored carbon fiber sheet can be black, either the same black as the low density, black carbon fiber sheet or a different shade of black.

Figure 2:
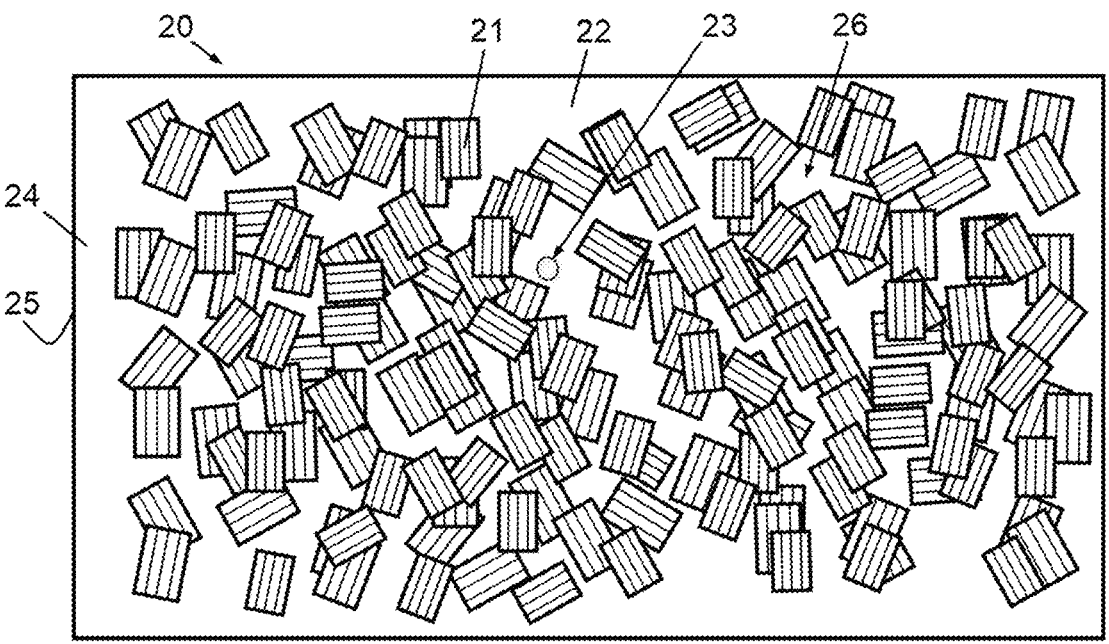
FIG. 2 is a top view of a sheet of low density, black carbon fiber.

Referring now to FIG. 2, a low density, black carbon fiber sheet 20 is shown. A black carbon fiber sheet is chopped into small pieces 21 which are dropped onto a layer of resin 22 to create the low density, black carbon fiber sheet 20. This process therefore produces a unique design for each instance of the low density, black carbon fiber sheet 20 due to the randomness of the chopped carbon fiber pieces 21 falling into the resin 22. The resin 22 and chopped carbon fiber pieces 21 are then bonded together by curing under high temperature and/or pressure. In some implementations, the curing temperature may be within the range of 135-160 degrees Celsius. Resin 22 can be any thermoset resin, including, but not limited to, epoxy resins, acrylic resins, polyesters, and vinyl esters. In some implementations, the chopped carbon fiber pieces 21 can be, but are not limited to, twelve millimeter by twelve millimeter squares. In other implementations, the chopped carbon fiber pieces can be any size or shape desired for the intended aesthetics and functionality of the trim component.

The term "low density, black carbon fiber sheet" is used throughout this disclosure to refer to a sheet of carbon fiber that defines holes 23 and/or gaps 26 where chopped black carbon fiber pieces 21 are not present. The term "holes" refers to a hole defined by the resin 22 that extends from a first surface 24 of the low density, black carbon fiber sheet 20 to a second surface 25 of the low density, black carbon fiber sheet 20. The term "gap" refers to a region of the low density, black carbon fiber sheet 20 where the resin 22 is present but chopped carbon fiber pieces 21 are not, the resin 22 being transparent to visible light. For example, if one looks at the low density, black carbon fiber sheet 20, they will see through the resin 22 in regions where chopped carbon fiber pieces 21 did not fall during processing or migrate to during curing. As is shown in FIG. 2, some chopped carbon fiber pieces 21 will fall on top of each other and overlap. The density of the low density, black carbon fiber sheet 20 is measured in grams of chopped carbon fiber pieces 21 per square meter of the low density, black carbon fiber sheet 20 ("g/m$^2$"). In other words, the density is measured in grams of total carbon fiber in the low density, black carbon fiber sheet 20 per square meter of the low density, black carbon fiber sheet 20. In one implementation, the density of the low density, black carbon fiber sheet 20 is approximately 200 g/m$^2$. In another implementation, the density is approximately 100 g/m$^2$. In other implementations, the density can be greater than 200 g/m$^2$ or less than 100 g/m$^2$.

In one implementation, both the colored carbon fiber sheet 10 and a black carbon fiber sheet from which the chopped carbon fiber pieces 21 are formed comprise a unidirectional configuration. In other implementations, the colored carbon fiber sheet and the black carbon fiber sheet from which the chopped carbon fiber pieces are formed may comprise any desired carbon fiber configuration, such as a woven or forged, and the colored carbon fiber sheet and the black carbon fiber sheet from which the chopped carbon fiber pieces are formed may comprise the same configuration or different configurations.

Figure 4:
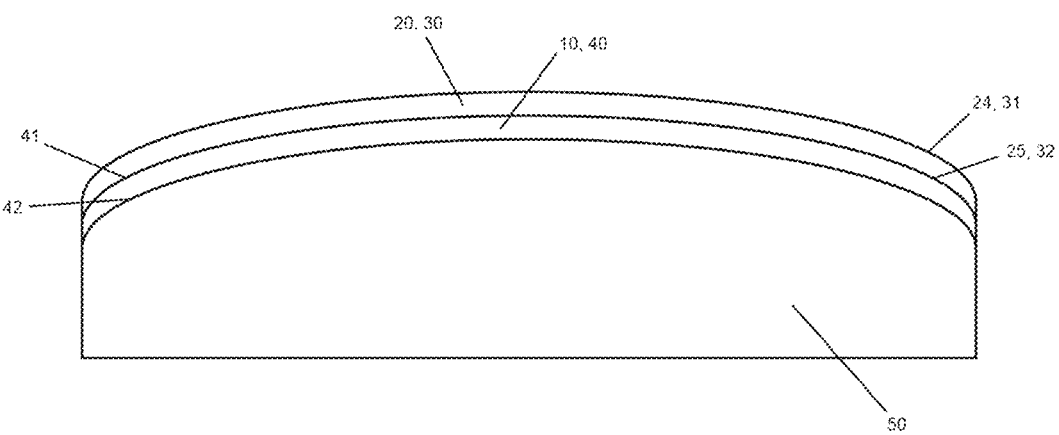
FIG. 4 is a side view of the sheets from FIGS. 1-2 laid upon each other and over a mold of a vehicle trim component.

To form the vehicle trim component, two layers of carbon fiber sheets are coupled together and formed around a trim component mold 50, as shown in FIG. 4. For example, a first layer 30 is laid upon a second layer 40, the second layer 40 being laid upon the mold 50. First layer 30 comprises at least one of the low density, black carbon fiber sheet 20 and the second layer 40 comprises at least one of the colored carbon fiber sheet 10. The first layer 30 has a first surface 31 facing away from the mold 50 and a second surface 32 facing toward the mold 50. The second layer 40 has a first surface 41 facing away from the mold 50 and a second surface 42 facing toward the mold 50. The second surface 42 of the second layer 40 is first laid upon the mold 50. The second surface 32 of the first layer 30 is then laid upon the first surface 41 of the second layer 40. Once laid upon each other, the first layer 30 and the second layer 40 are cured together to couple the second surface 32 of the first layer 30 to the first surface 41 of the second layer 40 and form the layered vehicle trim component according to the shape of the mold. The resin 22 bonds the layers 30, 40 to each other.

Figure 3:
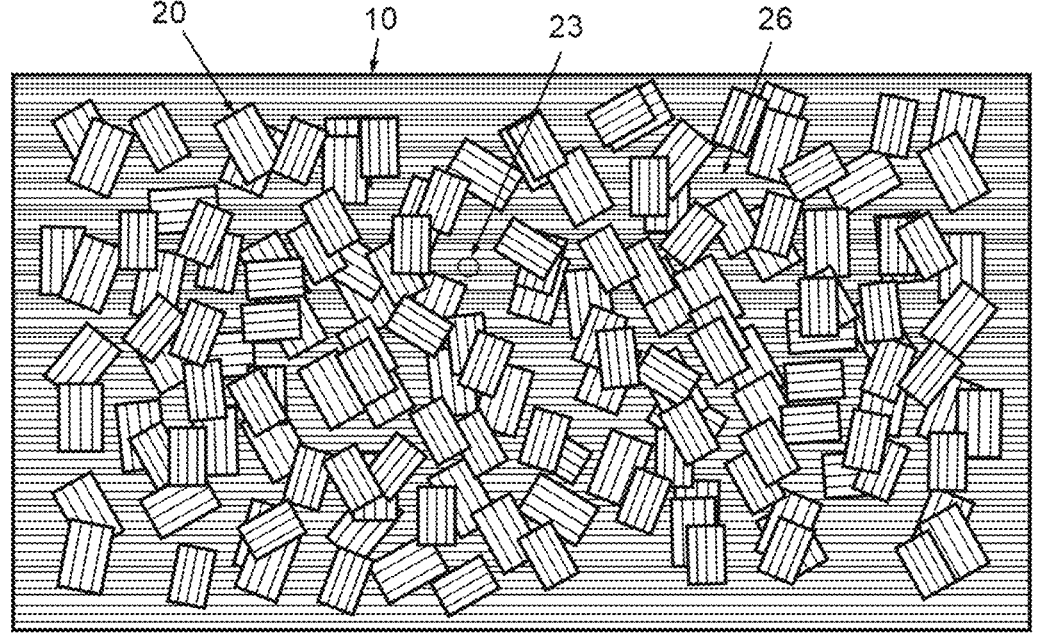
FIG. 3 is a top view of the sheets of carbon fiber from FIGS. 1-2 in a bonded, layered configuration.
Figure 5:
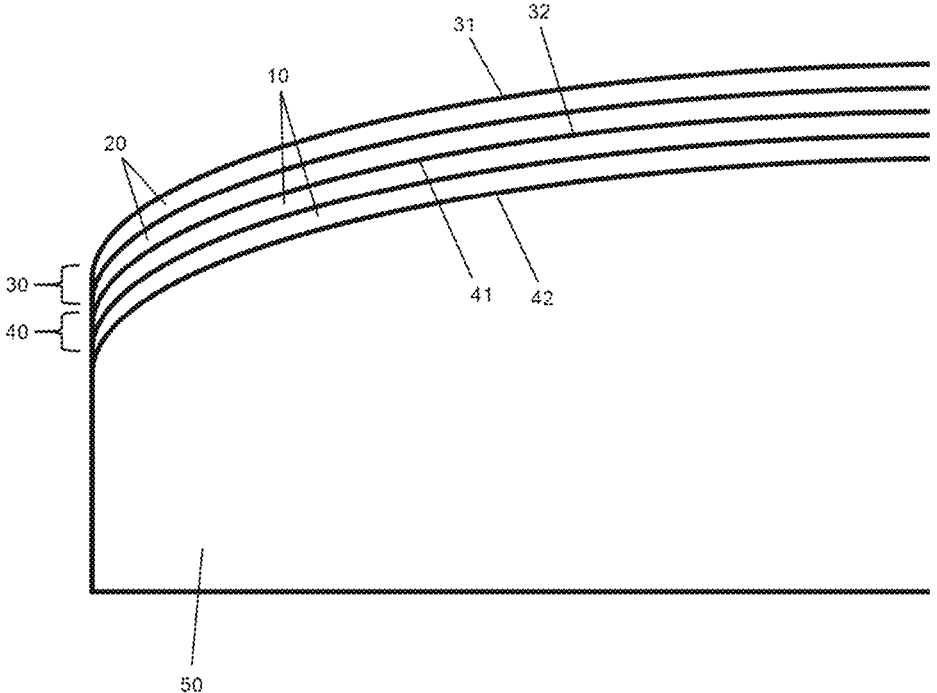
FIG. 5 is a partial side view of multiple sheets from FIGS. 1-2 laid upon each other and over the mold of the vehicle trim component.
Figure 6:
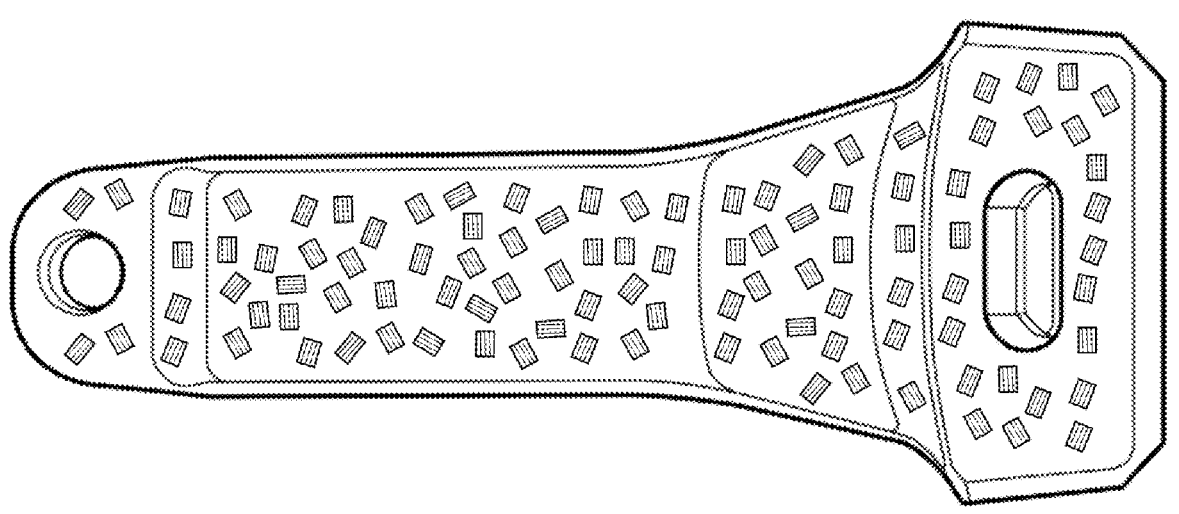
FIG. 6 is perspective view of a colored carbon fiber vehicle trim component according to one implementation.

FIG. 4 depicts one implementation of the vehicle trim component wherein the first layer 30 and second layer 40 each comprise a single low density, black carbon fiber sheet 20 and colored carbon fiber sheet 10, respectively. FIG. 5 depicts an implementation wherein the first layer 30 and the second layer 40 comprise more than one sheet of the low density, black carbon fiber sheet 20 and the colored carbon fiber sheet 10, respectively, specifically two sheets in each layer. Depending on the desired characteristics of the trim component, the first layer 30 and second layer 40 may comprise more than two sheets each. Therefore, the first layer 30 has holes 23 and/or gaps 26 throughout depending on the low density, black carbon fiber sheet(s) 20 from which the first layer 30 is formed. The density of the first layer 30 is also, therefore, determined by the number and density of the low density, black carbon fiber sheets 20 used in the first layer 30. Once the layered trim component is formed, portions of the second layer 40 are visible through the holes 23 and/or gaps 26 in the first layer 30, ensuring the color pattern of the second layer 40 is visible through the holes 23 and/or gaps 26 to a person viewing the trim component from the first surface 31 of the first layer 30. Due to light refraction in the resin 22, sheets of the same color, whether black or not, may appear to have different shadings, gradients, or even different colors, creating a unique design for each layered trim component. Referring to FIG. 3, the low density, black carbon fiber sheet 20 of FIG. 2 is shown laid upon the colored carbon fiber sheet 10 of FIG. 1, wherein the colored carbon fiber sheet 10 is visible through the holes 23 and/or gaps 26 in the low density, black carbon fiber sheet 20. An exemplary finished trim component is shown in FIG. 6. In other implementations, the first layer and second layer may comprise more than one sheet of the low density, black carbon fiber sheet and the colored carbon fiber sheet, respectively, wherein each sheet comprises the same color pattern, a different color pattern, or a combination of color patterns.

Figure 7:
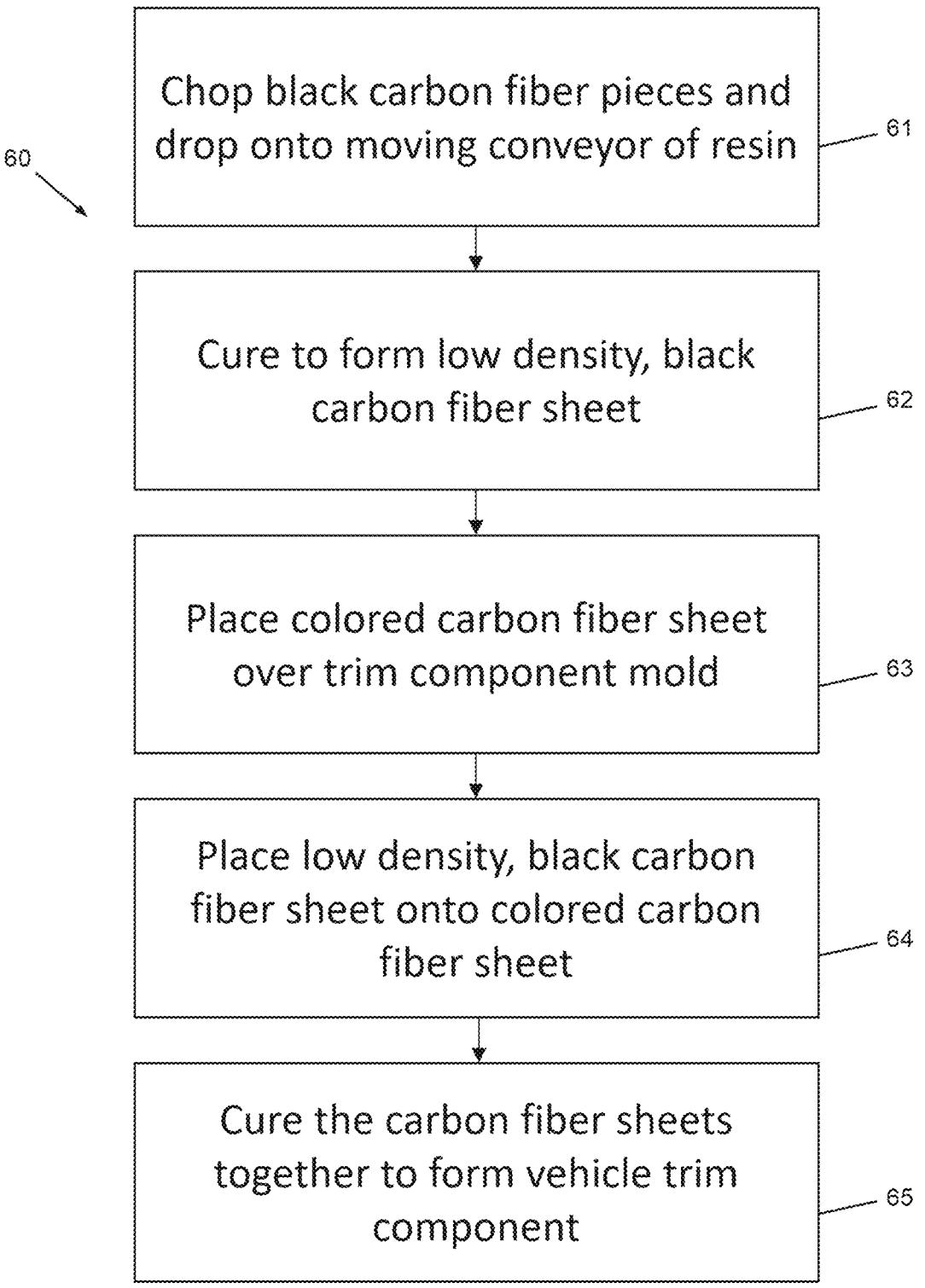
FIG. 7 is a flowchart of a process for forming the vehicle trim component.

Referring now to FIG. 7, a flowchart of a process 60 for forming the colored carbon fiber vehicle trim component is disclosed. The process 60 starts with block 61, wherein a black carbon fiber sheet is chopped to form chopped carbon fiber pieces 21 which are then dropped onto a moving conveyor of resin 22. The chopped carbon fiber pieces 21 and resin 22 are then cured together to form the low density, black carbon fiber sheet 20 in block 62. The colored carbon fiber sheet 10 is placed over the vehicle trim component mold 50 in block 63. In block 64, the low density, black carbon fiber sheet from block 62 is placed upon the colored carbon fiber sheet 10. The sheets 10, 20 are then cured together over the mold 50 to form the vehicle trim component in block 65.

A number of implementations have been described. The description in the present disclosure has been presented for purposes of illustration but is not intended to be exhaustive or limited to the implementations disclosed. It will be understood that various modifications and variations will be apparent to those of ordinary skill in the art and may be made without departing from the spirit and scope of the claims. Accordingly, other implementations are within the scope of the following claims. The implementations described were chosen in order to best explain the principles of the vehicle trim component and a method of formation, and to enable others of ordinary skill in the art to understand the vehicle trim component for various implementations with various modifications as are suited to the particular use contemplated.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof.

What is claimed is:

1. A vehicle trim component comprising:
a first layer comprising a first surface and a second surface, the first layer comprising a plurality of discrete unidirectional carbon fiber pieces, each cut from a carbon fiber sheet, the plurality of discrete unidirectional carbon fiber pieces set in a thermoset resin, the first layer comprising a first color pattern;
a second layer comprising a surface, the second layer comprising a material comprising a second color pattern;
wherein the surface of the second layer is coupled to the second surface of the first layer;
wherein the first layer defines a plurality of holes and/or gaps through which the surface of the second layer is visible when viewed through the first surface of the first layer,
wherein each of the discrete unidirectional carbon fiber pieces comprises a plurality of carbon fiber filaments that are parallel to each other, and
wherein the plurality of carbon fiber filaments of each of the discrete unidirectional carbon fiber pieces are oriented obliquely relative to the carbon fiber filaments of at least one other piece of the plurality of discrete unidirectional carbon fiber pieces.

2. The vehicle trim component of claim 1, wherein an orientation of each of the plurality of discrete unidirectional carbon fiber pieces is determined randomly.

3. The vehicle trim component of claim 1, wherein a density of the first layer is less than or equal to 200 and greater than or equal to 100 grams of carbon fiber per square meter of the first layer.

4. The vehicle trim component of claim 1, wherein the material of the second layer comprises a unidirectional carbon fiber sheet.

5. The vehicle trim component of claim 1, wherein the second color pattern of the second layer is different from the first color pattern of the first layer.

6. The vehicle trim component of claim 5, wherein the first color pattern of the first layer comprises a solid color, the solid color being black.

7. The vehicle trim component of claim 6, wherein the second color pattern of the second layer comprises a solid color, the solid color being a color other than black.

8. The vehicle trim component of claim 1, wherein each of the plurality of unidirectional carbon fiber pieces defines the same color pattern.

9. The vehicle trim component of claim 1, wherein the second layer comprises more than one sheet of material, each sheet comprising the same color pattern, a different color pattern, or a combination of color patterns.

10. A vehicle trim component comprising:
a first layer comprising a first surface and a second surface, the first layer comprising a plurality of discrete unidirectional carbon fiber pieces set in a thermoset resin, the first layer comprising a first color pattern;
a second layer comprising a surface, the second layer comprising carbon fiber, the carbon fiber of the second layer comprising a second color pattern;
wherein the surface of the second layer is coupled to the second surface of the first layer;

wherein the first layer comprises a plurality of holes and/or gaps through which the surface of the second layer is visible when viewed through the first surface of the first layer,
wherein each of the discrete unidirectional carbon fiber pieces comprises a plurality of carbon fiber filaments that are parallel to each other, and
wherein the plurality of carbon fiber filaments of each of the discrete unidirectional carbon fiber pieces are oriented obliquely relative to the carbon fiber filaments of at least one other piece of the plurality of discrete unidirectional carbon fiber pieces.

11. The vehicle trim component of claim 10, wherein an orientation of each of the plurality of discrete unidirectional carbon fiber pieces is determined randomly.

12. The vehicle trim component of claim 10, wherein the carbon fiber of the second layer comprises a unidirectional carbon fiber sheet.

13. The vehicle trim component of claim 10, wherein a density of the first layer is less than or equal to 200 and greater than or equal to 100 grams of carbon fiber per square meter of the first layer.

14. The vehicle trim component of claim 10, wherein the second color pattern of the second layer is different from first color pattern of the first layer.

15. The vehicle trim component of claim 14, wherein the first color pattern of the first layer comprises a solid color, the solid color being black.

16. The vehicle trim component of claim 15, wherein the second color pattern of the second layer comprises a solid color, the solid color being a color other than black.

17. A vehicle trim component comprising:
a first layer comprising a first surface and a second surface, the first layer comprising a plurality of discrete chopped carbon fiber pieces set in a thermoset resin, the plurality of chopped carbon fiber pieces comprising a first color pattern;
a second layer comprising a surface, the second layer comprising a sheet of unidirectional carbon fiber, the sheet of unidirectional carbon fiber comprising a second color pattern;
wherein the surface of the second layer is coupled to the second surface of the first layer;
wherein the first layer comprises a plurality of holes and/or gaps through which the surface of the second layer is visible when viewed through the first surface of the first layer,
wherein each of the discrete chopped carbon fiber pieces comprises a plurality of carbon fiber filaments that are parallel to each other, and
wherein the plurality of carbon fiber filaments of each of the discrete chopped carbon fiber pieces are oriented obliquely relative to the carbon fiber filaments of at least one other piece of the plurality of discrete chopped carbon fiber pieces.

18. The vehicle trim component of claim 17, wherein a density of the first layer is less than or equal to 200 and greater than or equal to 100 grams of carbon fiber per square meter of the first layer.

19. The vehicle trim component of claim 17, wherein the second color pattern of the second layer is different from the first color pattern of the first layer.

20. The vehicle trim component of claim 19, wherein the first color pattern of the first layer comprises a solid color, the solid color being black.

21. The vehicle trim component of claim 20, wherein the second color pattern of the second layer comprises a solid color, the solid color being a color other than black.

\* \* \* \* \*